United States Patent [19]

Woo et al.

[11] Patent Number: 5,051,470

[45] Date of Patent: Sep. 24, 1991

[54] EPOXY-ACRYLIC GRAFT POLYMERS

[75] Inventors: James T. K. Woo, Medina; Richard M. Marcinko, North Royalton, both of Ohio

[73] Assignee: The Glidden Company, Cleveland, Ohio

[21] Appl. No.: 104,062

[22] Filed: Oct. 5, 1987

Related U.S. Application Data

[63] Continuation-in-part of Ser. No. 859,421, May 5, 1986, abandoned.

[51] Int. Cl.$^5$ .............................................. C08G 59/14
[52] U.S. Cl. ..................................... 523/411; 523/412
[58] Field of Search ................. 525/63, 118, 531, 930; 523/407, 411, 412

[56] References Cited

U.S. PATENT DOCUMENTS

| 4,355,122 | 10/1982 | Fan | 525/930 |
| 4,443,568 | 4/1984 | Woo | 523/412 |
| 4,482,671 | 11/1984 | Woo et al. | 525/930 |
| 4,522,961 | 6/1985 | Martino et al. | 523/407 |

Primary Examiner—Melvyn I. Marquis
Assistant Examiner—Robert E. L. Sellers, II
Attorney, Agent, or Firm—Thomas M. Schmitz

[57] ABSTRACT

Phenoxy terminated epoxy resins are grafted by carbon-carbon graft with ethylenic monomers, including alkylol acrylamide monomer, by in-situ polymerization to produce grafted epoxy-acrylic copolymers useful as binders in protective coatings. The cured paint films exhibit superior resistance to pine oil and limonene derivatives.

12 Claims, No Drawings

EPOXY-ACRYLIC GRAFT POLYMERS

This is a continuation-in-part of copending application Ser. No. 859,421 filed May 5, 1986, now abandoned, and the same is incorporated herein by reference.

This invention is directed to low acid number epoxy-acrylic graft polymers and more particularly to phenoxy terminated epoxy polymers grafted with ethylenic monomers including alkylol acrylamide monomer.

Epoxy resins are particularly desirable for use in surface coating materials as a vehicle or polymeric binder for pigments, fillers, and other additives whereby epoxy resins advantageously provide toughness, flexibility, adhesion, and chemical resistance. Water-dispersed coating compositions containing epoxy resins are highly desirable for can coating compositions. Coatings for soft drink and beer cans, for instance, are critical due to taste sensitivity wherein such sanitary can coatings must not alter the product taste of canned beverages. Taste problems can occur in a variety of ways such as by leaching of coating components into the beverage, or by adsorption of flavor by the coating, or sometimes by chemical reaction, or by some combination thereof. In commonly assigned U.S. Pat. No. 4,212,781, a process is disclosed for modifying epoxy resin by reacting the epoxy resin with addition polymerizable monomer in the presence of at least 3% by weight of benzoyl peroxide (or the free radical initiating equivalent thereof) based on monomer at a suitable reaction temperature. This reaction produces a reaction mixture containing an in-situ formed blend of resinous materials comprising an epoxy-acrylic copolymer mixture containing epoxy resin, graft epoxy-acrylic polymer, and associatively-formed ungrafted addition polymer. The in-situ polymerized monomers include acid functional monomers to provide acid functionality in the reaction mixture sufficiently high to effect stable dispersion of the resulting reaction product in a basic aqueous medium. In a preferred embodiment of U.S. Pat. No. 4,212,781, a polyglycidyl ether of bisphenol-A is reacted with a mixture of addition polymerizable monomers containing an acrylic such as methacrylic acid. The epoxy resin has a molecular weight above 4,000 and provides from 50% to 90% of the initial reaction mixture. The reaction takes place in the presence of benzoyl peroxide at an elevated temperature above 80° C. and preferably between about 110° C. and 130° C. to effect addition polymerization of the monomer and produce addition polymer grafted to the epoxy resin. The reaction product can be dispersed in a basic aqueous medium to form a water-reducible epoxy-acrylic copolymer mixture.

In commonly assigned U.S. Pat. No. 4,522,961, it was found that certain reactive self-curing water dispersed polymers blended with an epoxy-acrylic copolymer mixture provides an excellent sprayable coating suitable for an interior coating for beverage and food containers. The reactive self-curing water-dispersed polymer contains copolymerized monomers including functional carboxyl, hydroxyl, amine, or amide monomers in combination with alkylol acrylamide monomer. The monomers preferably are polymerized in a step-wise reaction to concentrate the alkylol acrylamide on the surface of the water dispersed polymer particles to provide an improved stabilized water-dispersed polymer exhibiting surprisingly good rheological properties including viscosity, stability and spray application. By concentrating alkylol acrylamide on the polymer surface and by polymerizing at temperatures preferably above 70° C., it is believed that a minor amount of alkylol acrylamide reacts and cross-links with a minor amount of functional monomer during the addition polymerization of ethylenic monomers to provide a relatively rigid or hard polymer particle surface, which apparently stabilized the viscosity of the water-dispersed blend as well as provide considerable shear resistance during subsequent spray application of the polymeric blend. By blending the reactive self-curing water-dispersed polymer with a water-dispersed epoxy-acrylic copolymer, the blend provides an excellent sprayable interior coating particularly suitable for beverage cans. A preferred polymeric blend comprises an aqueous dispersed phosphated polymer blended with the reactive self-curing latex polymer and the epoxy-acrylic copolymer.

In commonly assigned U.S. Pat. No. 4,499,212 a sprayable latex polymer produced by step-wise copolymerization of ethylenic monomers, including alkylol acrylamide monomer, functional monomer, and other ethylenic monomers are copolymerized in water to produce a self-curing latex copolymer.

U.S. Pat. No. 4,355,122 discloses water-dispersed high molecular weight phenoxy resins derived from diphenols and epichlorohydrin.

It now has been found that phenoxy terminated epoxy resins grafted with ethylenically unsaturated monomers, including at least one alkylol acrylamide monomer, by in-situ polymerization in the presence of at least 3% by weight peroxide catalyst to provide a carbon-to-carbon graft with epoxy polymer provides an excellent low acid number self-curing epoxy-acrylic copolymer. The composition can be readily dispersed into water even though the Acid No. is below 30 and advantageously provides a small particle size polymeric dispersion useful as a water dispersed coating particularly useful as interior coatings for food and beverage containers. These and other advantages of this invention will become more apparent from the detailed description of the invention and the illustrative examples.

SUMMARY OF THE INVENTION

Briefly, the composition comprises a high molecular weight, low acid number epoxy polymer grafted with copolymerized ethylenically unsaturated monomers by carbon-to-carbon graft to the epoxy polymer backbone to produce an epoxy-acrylic graft copolymer. The composition is produced by copolymerizing the ethylenic monomers, including alkylol acrylamide monomer, in the presence of epoxy polymer by in situ polymerization where at least 3% peroxide initiator based on the weight of monomers to produce an in-situ formed mixture of carbon-to-carbon graft epoxy-acrylic copolymer, ungrafted acrylic copolymer, and ungrafted epoxy resin.

DETAILED DESCRIPTION OF THE INVENTION

The polymeric composition of this invention comprises epoxy polymer grafted with copolymerized ethylenic monomers including alkylol acrylamide monomers.

Referring first to the epoxy resin, the epoxy can be either aliphatic or aromatic, although the aromatic epoxy resins are preferred. The most preferred epoxy resins are polyglycidyl ethers of bisphenol-A, produced from excess equivalents of bisphenol-A to provide a phenoxy terminated epoxy resin. The molecular weight of epoxy resins should be from about 350 to about 40,000, and preferably, for sanitary coating compositions, from about 4,000 to about 40,000 number average molecular weight. In producing the phenoxy terminated epoxy resins, mixtures of monoepoxides and diepoxides can be reacted with phenoxy although minor amounts of the aromatic polyether can be devoid of oxirane functionality by reacting epoxide groups with benzoic acid, phenol or similar monoreactive epoxide blocking agent.

While it is sometimes convenient to use a finished epoxy resin at the desired molecular weight, it is often more practical to start with bisphenol A and the bisglycidyl ether of bisphenol A, which is available from commercial sources. The bisglycidyl ether of bisphenol A, known generally as low molecular weight liquid epoxy resin, is available in precatalyzed form from Dow Chemical Co. under the trade name DER-333, which contains as a catalyst the complex of ethyl triphenyl phosphonium acetate with acetic acid. Other commercial epoxy resins are commercially available from Shell Chemical Co. under the trade name Epon 829 and Epon 828, etc.

The precatalyzed liquid epoxy resin from Dow Chemical Co., DER-333, has the following physical properties:

TABLE I

| Properties of DER-333 Epoxy Resin | |
|---|---|
| Appearance | Clear, viscous liquid |
| Color (Gardner) | 1-2 |
| Specific gravity | 1.15 |
| Weight per gallon | 9.65 |
| Nonvolatile by weight | 96 ± 1% |
| Volatile | Xylene |
| Nonvolatile by volume | 95% avg. |
| Viscosity at 25° C. | 2300-2400 cps |
| Epoxide equivalent weight* | 199-202 |

*Epoxide equivalent weight is the grams of resin containing one gram equivalent weight of epoxy.

To increase the initial molecular weight of a low molecular weight liquid epoxy resin to a level that is more satisfactory for many coating applications, the initial liquid epoxy resin can be reacted with additional bisphenol A or other bisphenol compounds. Other polyfunctional aromatic alcohols can be used to make the glycidyl ether such as described in U.S. Pat. No. 4,212,781 and is incorporated herein by reference.

The ratio of bisphenol-A to low molecular weight, liquid epoxy resin coreacted in accordance with this invention to produce a phenoxy terminated epoxy resin determines the epoxy molecular weight as well as whether the higher molecular weight epoxy resin is epoxide terminated or phenoxy terminated. The weight ratio of bisphenol-A between 0.1 and 0.56 per one weight part DER-333 for instance will produce an epoxide terminated epoxy polymer. Weight ratio of bisphenol-A between 0.6 and 0.9 per one weight part of DER-333 for instance will produce a phenoxy terminated epoxy polymer. As a generalization, excess equivalents of bisphenol-A relative to lesser epoxide equivalents of the lower molecular weight epoxy resin (biglycidyl ether of bisphenol-A) produces a phenoxy terminated epoxy polymer in accordance with this invention. In contrast, a deficiency of equivalents of bisphenol-A produces an epoxide terminated epoxy polymer outside the scope of this invention.

For many coating applications, the epoxy resin can have a molecular weight in the range from about 350 to about 40,000 and desirably between 350 and 20,000 based on number average. However, for more demanding applications, particularly for applications where the end product is to be a sanitary coating, epoxy resin molecular weight values in the range from about 4,000 to about 40,000 are preferred. These and other molecular weight determinations of the epoxy resin components can be made by oxirane value titration but preferably are made by gel permeation chromatography (GPC).

Epoxy resins include epoxy derivatives such as phenoxy terminated resins comprising substantially linear polymers of the general formula:

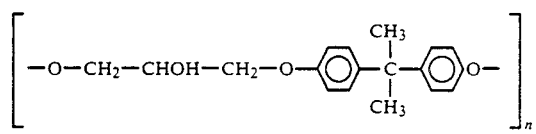

where n=30 to 80 or more. The phenoxy resins can include mixtures of two or more thermoplastic polyhydroxyethers derived from diphenols and epichlorohydrin.

Referring next to ethylenically unsaturated monomers, such monomers contain carbon-to-carbon unsaturation and include generally vinyl monomers, acrylic monomers, acrylamide and allylic monomers. The alkylated alkylol acrylamide monomers can be derivatives of acrylamide, methacrylamide, methylol acrylamide, or similar alkyl modified acrylamide monomer as shown for example in U.S. Pat. No. 3,991,216; U.S. Pat. No. 4,097,438; and U.S. Pat. No. 4,305,859. The acrylamide monomers preferably are alkylated with an alkyl group such as methyl, ethyl, propyl, n-butyl, or isobutyl, and similar alkylated alkylol acrylamide monomers, wherein the butylated monomers are preferred. Functional monomers include carboxyl or hydroxyl functional group containing monomers. Carboxy containing monomers include acrylic acid and lower alkyl substituted acrylic acids wherein the preferred carboxylic monomers are acrylic and methacrylic acids. Hydroxyl containing monomers are hydroxy containing ethylenically unsaturated monomers including hydroxy alkyl acrylates such as 2-hydroxy ethyl acrylate and methacrylate, 2-hydroxy-propyl acrylate and methacrylate, and similar hydroxy alkyl acrylates. On a weight basis, the ethylenically unsaturated monomers can comprise between 1% and 25% alkylated alkylol acrylamide monomer and between 1% and 35% functional monomer.

The remaining other ethylenically unsaturated monomers that can be copolymerized with the alkylol acrylamide monomer and functional monomers to form the reactive water dispersed polymer, comprise ethylenic double bond unsaturated monomers including vinyl, vinylidene, acrylic, allylic and unsaturated mono or dicarboxylic acids. Vinyl monomers include, for example, vinyl esters such as vinyl acetate, vinyl propionate, vinyl butyrates, vinyl benzoate, isopropenyl acetate and similar vinyl esters; and vinyl halides such as vinyl chloride. Vinyl aromatic hydrocarbon monomers can include, for example, styrene, methyl stryenes, and similar alkyl styrenes, chlorostyrene, vinyl toluene, vinyl naphthalene, divinyl benzene, diallyl phthalate and similar diallyl derivatives. Vinyl aliphatic monomers include olefinic unsaturated monomers such as butadiene, substituted butadienes, cyclopentadienes, dicyclopentadiene, cyclohexene, and vinyl naphthalene. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acylic and methacrylic acids, hydroxyl alkyl acrylates and methacrylates such as hydroxyethyl and hydroxypropyl acrylates and methacrylates, as well as amino acrylates and methacrylates.

In accordance with this invention, the preferred graft epoxy-acrylic copolymer mixture is prepared by in-situ polymerization of the ethylenic monomers with epoxy resin and in the absence of water. The epoxy resin can be heated in a reactor wherein the polymerizable monomer can be added slowly over a period of at least two or three hours along with a solvent and a free radical initiator. Although the reaction may be conducted in the absence of solvent, a solvent system is preferred for the in-situ polymerization of monomers in the presence of epoxy resin. A preferred solvent system comprises two miscible solvents, one of which dissolves the epoxy resin and the other of which dissolves the monomers. The particular solvents satisfactory for the epoxy resin are solvents such as xylene, benzene, ethyl benzene, toluene, and the alkoxy alkanols. For the monomer, alcohols such as methanol, ethanol, propanol, butanol, and the like, are suitable with butanol being preferred. Ethylene glycol monobutyl ether, ethylene glycol monobutyl ether acetate, and the like, hexane, mineral spirits, and the like, are also suitable. For subsequent dispersion into water, the solvents selected should be water-soluble materials, as are acetone, butanol, ethanol, propanol, ethylene glycol monoethyl ether, and the like. Ordinarily the amount of solvent may be in the range from about 5% to 30% by weight of the sum of the other components. In practice, the epoxy resin and the mixture of polymerizable monomers are reacted together in the presence of a free radical initiator, preferably of the peroxide type, and benzoyl peroxide is most preferred. Typical and useful free radical initiators include cumene hydroperoxide, benzoyl peroxide, t-butyl perbenzoate, t-butylperoxide, lauroyl peroxide, methyl ethyl ketone peroxide, chlorobenzoyl peroxide, and the like. Benzoyl peroxide is preferred as the free radical initiator for use in the practice of the present invention. The amount of free radical catalyst is expressed in terms of percentage by weight of benzoyl peroxide based on the total weight of the polymerizable monomer, or equivalent, at the temperature of use. The amount of catalyst should be at least 3%, and preferably more than 4% by weight of benzoyl peroxide or equivalent based on monomer weight. The reaction temperature preferably is maintained in the range from about 80° C. to about 130° C., although the temperature may be adjusted within a relatively wide range to accomodate the reactivity of the mixture. Thus, operating temperatures in the range from about 30° C. to about 200° C. are feasible, depending upon the end results and operating conditions selected. After the monomers are added, the reaction mixture is normally held for up to three hours at reaction temperature to complete the monomer conversions.

The foregoing in-situ formed mixture comprising graft epoxy polymer, ungrafted acrylic copolymer, and ungrafted epoxy polymer is produced by reacting on a weight basis between 10 and 100 weight parts of ethylenic monomer including alkylol acrylamide monomer per 100 weight parts of epoxy polymer. The foregoing in-situ formed epoxy-acrylic copolymer mixture can then be combined with an aminoplast cross-linking resin components on a polymer solids weight basis between 1 and 40 weight parts cross-linking resin per 100 weight parts of in-situ formed epoxy-acrylic copolymer.

Aminoplast resins are melamine or melamine derivatives and the reaction product of ureas and melamines with aldehydes and in some instances further etherified with alcohol such as methylol melamine or similar alkylated melamine formaldehyde resins. Aminoplasts further include benzoguanamine, acetoguanamine, as well as ureaformaldehyde. Commercially available aminoplasts which are water-soluble or water-dispersible for the instant purpose include Cymel 301, Cymel 303, Cymel 325, Cymel 325, Cymel 370, and Cymel 373 (all being products of American Cyanamid, Stamford, Conn., said aminoplasts being melamine based, e.g., hexamethoxy-methyl melamine for Cymel 303), and Beetle 80 products of American Cyanamid which are methylated or butylated ureas.) Other suitable aminoplast resins are of the type produced by the reaction of aldehyde and formal guanamines; ammeline; 2-chloro-4,6-diamine-1,3,5-triazine; 2-phenyl-p-oxy-4,6-diamino-1,3,5-tri-azine; and 2,4,6-triethyl-triamino-1,3,5-triazine. The mono, di-, or tri-aryl melamines, such as 2,4,6-triphenyl-triamino-1,3,5-triazine, are preferred. Examples of aminoplast resin components are urea, ethylene urea, thiourea, melamine, benzoguanamine and acetoguanamine. Aldehydes useful in this invention are formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of aminoplast resins are methylol urea, dimethoxymethylol urea, butylated polymeric urea-formaldehyde resins, hexamethoxymethyl melamine, methylated polymeric melamineformaldehyde resin and butylated polymeric melamineformaldehyde resin. Other aldehydes used to react with the amino compound to form the resinous material are crotonic aldehyde, acrolein, or compounds which generate aldehydes, such as hexamethylene-tetramine, paraldehyde, and the like.

A water dispersed coating composition can be prepared by mixing together an aqueous dispersion of the in-situ formed epoxy-acrylic copolymer and a water dispersed aminoplast resin. The aminoplast polymer can be dispersed into water by mechanical mixing. The in-situ formed epoxy acrylic copolymer mixture can be prepared in solvent and then subsequently dispersed into water using a fugitive base such as primary, secondary, and tertiary alkyl, alkanol, aromatic amines, or alkyanolalkyl mixed amines such as monoethanol amine, dimethyl ethanol amine, diethanol amine, triethyl amine, dimethyl aniline, ammonium hydroxide, and the like, as more particularly described in U.S. Pat.

No. 4,212,781. The amount of water contained in the coating composition containing the epoxy-acrylic copolymer, and the aminoplast resin depends on the viscosity desired, which in turn, relates to the method of application. For spraying, preferably the coating composition contains between about 10% and 30% by weight polymeric solids relative to 70% to 90% water including other volatiles such as minor amounts of solvent. For applications other than spraying, the aqueous polymeric dispersions can contain between about 10% and 40% by weight water. Organic solvents can be utilized to facilitate spray or other application methods and such solvents include n-butanol, butyl cellosolve, xylene, toluene, and preferably n-butanol is used in combination with butyl cellosolve (2-butoxy-ethanol-1). The coating composition of the present invention can be pigmented and/or opacified with known pigments and opacifiers. For many uses, including food use, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 95° C. to about 235° C. or higher for time sufficient to effect complete curing as well as volatilizing of any fugitive component therein.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 0.1 to 1 mil.

For a better understanding of the present invention, the following examples are provided. In this application, all parts are parts by weight, all percentages are weight percentages, and temperatures are degrees Centigrade unless otherwise specifically noted.

EXAMPLE 1

Phenoxy Grafted Copolymer with 3% MAA

Into a 5 liter, 4-necked round bottom flask was charged 875 g. of butyl cellosolve. Through one neck was fitted an air driven mechanical stirrer, through the second neck was placed a water cooled condenser, through the third neck was placed a thermometer an nitrogen inlet and through the fourth neck was placed an addition funnel. The butyl cellosolve was heated to 170° C. with agitation and nitrogen sparge, and 1000 g. of phenoxy resin PK HH (from Union Carbide) was slowly added so that dissolution takes place without lumping. Any water present was removed through a trap. After all of the phenoxy resin has dissolved, 25 g of volatile was removed through the trap, and 25 g. of butyl cellosolve was added back into the reaction flask to replace the volatile that was removed. The phenoxy resin solution is now cooled to 115° C. and 100 g. of n-butanol was then added. Temperature is now stabilized at 110° C. and a monomer mixture of 37.5 g. of methacrylic acid, 187.5 g. of NiBMA (N-isobutoxymethylacrylamide), 12.5 g. of styrene, 12.5 g. of ethyl acrylate, 22.1 g. of BPO-78 (Benzoyl Peroxide 78% active in water) and 75 g. of butyl cellosolve was added to the phenoxy resin solution in two hours. The reaction mixture was then held at 110° C. for an hour before its let down into water; 2000 g. of deionized water was heated to 50° C., 30.5 g. of dimethylethanolamine and 100 g. of butyl cellosolve were added to the water; 1800 g. of the grafted phenoxy resin solution was slowly dropped into the agitated water-amine solution. A dispersion formed easily. The dispersion had the following constants:

| NV | 24.0% |
|---|---|
| AN | 26.8 (Acid number) |
| BN | 20.9 (base number) |
| % neutralization | 77.8% |

EXAMPLE 2

Phenoxy Grafted Copolymer with 2% MAA

Into a 5 liter 4-necked round bottom flask similarly equipped as in Example 1 was charged 875 g. of butyl cellosolve and heating was applied. When the temperature reached 165° C., 1000 g. of phenoxy resin PKHH was slowly dropped into the butyl cellosolve solution, so that dissolution takes place without lumping. Any water present in the phenoxy resin was stripped off and replaced by butyl cellosolve. After all the phenoxy resin had dissolved the resin solution was cooled to 120° C. and 100 g. of n-butanol was added. The temperature is now stabilized at 115° C. and a monomer solution made of the following:

| MAA | 25 g |
|---|---|
| NiBMA | 187 g |
| Styrene | 25 |
| Ethylacrylate | 12.5 |
| BPO (78) | 22.1 |
| Butyl cellosolve | 75 | were added to the phenoxy resin solution in two hours and held at 115° C. for 1½ hours, 1800 g of the grafted copolymer is now dropped into a solution of 2000 g. of deionized water, 27.4 g. of dimethylethanolamine and 100 g. of butyl cellosolve. The temperature of the H₂O-amine-butyl cellosolve solution was 50° C. Initially, the dispersion was grainy, however, after agitation overnight the dispersion became smooth and had the bluish color. The dispersion had the following constants:

| NV | 23.1% |
|---|---|
| AN | 20.2 |
| BN | 20.0 |
| % neutralization | 100% |

EXAMPLE 3

Phenoxy Grafted Copolymer with 1% MAA

Into a 5 liter 4-necked round bottom flask similarly equipped as in Example 1 was charged 875 g. of butyl cellosolve and heating was applied. When the temperature reached 160° C., 1000 g. of phenoxy resin PKHH was slowly dropped into the hot butyl cellosolve. When all the phenoxy resin dissolved, the solution was cooled to 120° C. and 100 g. of n-butanol was added. The temperature was now stabilized at 115° C. and a monomer solution made of the following:

| MAA | 12.5 g. |
|---|---|
| NiBMA | 187.5 g. |

| | | |
|---|---|---|
| Styrene | 25 g. | |
| Ethyl acrylate | 25 g | |
| BPO (78%) | 22.1 g. | |
| Butyl cellosolve | 75 g. | | were added to the phenoxy resin solution in two hours. After the addition of the monomers, the reaction mixture was held at 115° C. for 1½ hours and is now ready to be dropped into water. The drop was done in 2 ways:

| (a) | Resin | 1800 g. |
|---|---|---|
| | Deionized water | 2000 g. |
| | Dimethylethanol amine | 10.2 g. |
| | Butyl cellosolve | 100 g. |

The water-amine-butyl cellosolve was heated to 50° C. before the resin is dropped. The emulsion formed was grainy and 10.2 g. of dimethyl ethanol amine and 700 g. of deionized water were added. The emulsion became less grainy.

| | NV | 24.6% |
|---|---|---|
| | AN | 14.1 |
| | BN | 13.4 |
| | % neutralization | 95.3% |
| (b) | Resin | 200 g. |
| | Deionized water | 222 g. |
| | Dimethylethanolamine | 2 g. |

The water amine solution was at room temperature. The hot resin dispersed into the water-amine solution. The emulsion had small beads present which disappeared after further agitation. The NV of the emulsion was 25.6%

EXAMPLE 4

Advanced epoxy resin grafted with 3% MAA

Into a 4-necked 5 liter round bottom flask was charged 1266.4 g. of a liquid epoxy resin DER333 (Dow Chemical Company), 733.6 g. of Bisphenol A and 278.4 g. of butyl cellosolve. The reaction mixture was heated to 150° C. under 18" Hg vacuum and nitrogen sparge. Heating was stopped and exotherm carried the temperature to 182° C. Vacuum was then turned off and 23.5 g. of volatile was collected. The temperature was held at 176° C. for 5½ hours, at the end of the hold, the % oxirane was determined to be 0.088 and the Gardner-Holt viscosity of the advanced epoxy resin at 40% solids in butyl cellosolve was Z6. 265.2 g. of butyl cellsolve was slowly added to the epoxy resin solution followed by 911.4 g. of n-butanol.

To 1654 g. of the above epoxy resin solution was added a monomer mixture consisted of the following:

| MAA | 34.8 g. |
|---|---|
| Styrene | 11.6 g. |
| Ethyl acrylate | 11.6 g. |
| NiBMA | 173.8 g. |
| BPO (78%) | 20.5 g. |
| Butyl cellosolve | 69.5 g. |

The epoxy resin solution was at 115° C. The monomer addition took 1½ hour, and the reaction mixture was held at 115° C. for 3 hours and is then ready for drop into water. 1652 g. of the resin is slowly dropped into 2000 g. of deionized water, 40 g. of dimethyl ethanol amine and 100 g. of butyl cellosolve. The water solution as heated to 50° C. before the resin dropping. The emulsion formed easily and 100 g. of deionized water was then added to the emulsion.

EXAMPLE 5

Advanced epoxy resin grafted with 1% MAA

To 1551 g. of epoxy resin solution prepared in the first paragraph of Example 4 was added a monomer mixture consisting of

| MAA | 10.9 g. |
|---|---|
| Styrene | 21.7 g. |
| Ethyl acrylate | 21.7 g. |
| NiBMA | 163 g. |
| BPO (78%) | 19.2 g. |
| Butyl cellosolve | 65.2 g. |

The epoxy resin was heated to 115° C. and the monomer mixture was added in 2 hours, and the resultant reaction mixture was held for 3 hours at 115° C. 1500 g. of the resin was then dropped into a solution at 50° C. of

| deionized water | 2000 g. |
|---|---|
| dimethylethanol amine | 19 g. |
| butyl cellosolve | 90 g. |

Initially, the resin did not solubilize well. The top liquid phase was replaced by deionized water and now the resin dispersed well and formed a smooth emulsion with bluish color.

A sample of the composition disclosed in Example 1 of U.S. Pat. No. 4,212,781 was compared with NiBMA grafted phenoxy compositions produced in accordance with this invention and illustrated in Examples 1-5 inclusive. The cured film properties were comparable with respect to porosity, pasteurization, detergent resistance, MEK rubs, and flexibility. However, pine oil absorption of the cured films differed considerably as follows:

| Example 1 of U.S. Pat. No. 4,212,781 | 1.8 mg absorption |
|---|---|
| Examples 1-5 inclusive | 0.5 mg. absorption |

Pine oil is a severe test based on the fact that limonene is present in some soft drinks, as well as pine oil. The test panels containing cured paint films were exposed to pine oil vapors in closed containers for 3 days. The weight pick-up on the test panels (foil) indicates the absorption. The cured paint films of Examples 1-5 indicate improved barrier properties and a superior interior can coating.

In accordance with the invention, all of these grafted copolymers with low acid number (below 30) have self-curing capability as well as curable with other crosslinkers such as melamine resin, urea resins, phenolic resins, epoxy resins diisocyanates etc. Due to the low acid number, the coatings made from these grafted copolymers have excellent properties, e.g., salt spray, detergent resistance etc., as well as superior resistance to pine oil. They also have excellent adhesion to various substrates and are extremely tough.

The merits of the invention are illustrated by the foregoing description and illustrative examples, but are not intended to limit except as by the appended claims.

We claim:

1. A self-curing epoxy-acrylic graft copolymer comprising unsaturated monomer chains grafted by carbon-to-carbon graft to the epoxy resin backbone by in-situ copolymerization of said monomers in the presence of said epoxy resin, said epoxy resin being a phenoxy terminated epoxy comprising excess equivalents of bisphenol reacted with lesser equivalents of epoxide and having a number average molecular weight between 4,000 and 40,000, the ethylenically unsaturated monomers comprising between 1% and 25% by weight alkylated alkylol acrylamide monomer and the remaining being other ethylenic monomers including functional monomer, said graft copolymer produced in the absence of water by in-situ polymerization of said ethylenically unsaturated monomers in the presence of at least 3% by weight of peroxide initiator based on the weight of said ethylenically unsaturated monomers copolymerized, the polymerized monomers comprising between 10 and 100 weight parts per 100 weight parts of epoxy resin, where the Acid No. of the epoxy-acrylic graft copolymer is below 30, and said epoxy-acrylic graft copolymer is dispersed into water by adding amine and water to the epoxy-acrylic graft copolymer.

2. The composition in claim 1 wherein the in-situ polymerization of monomers is in the presence of organic solvent to produce a solvent dispersed epoxy-acrylic graft copolymer before dispersing into water.

3. The composition in claim 1 wherein the in-situ polymerization is in the absence of organic solvent and the epoxy-acrylic graft copolymer is subsequently dispersed into organic solvent before dispersing into water.

4. The composition in claim 1 wherein the epoxy-acrylic graft copolymer comprises carbon to carbon graft epoxy-acrylic copolymer, ungrafted acrylic copolymer, and ungrafted epoxy resin.

5. The composition in claim 1 wherein the polymerized ethylenically unsaturated monomers include carboxyl monomers.

6. The composition in claim 5 wherein the carboxyl monomers comprise between 1% and 35% of the ethylenically unsaturated monomer.

7. The composition in claim 1 where the phenoxy terminated epoxy resin comprises a substantially linear polymer characterized by the general formula:

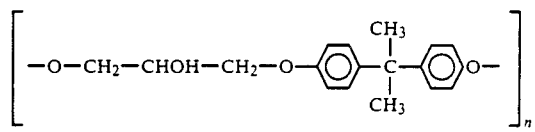

where n is between 30 and 80.

8. In a process for producing a self-curing epoxyacrylic graft copolymer by in-situ copolymerization of ethylenically unsaturated monomers in the presence of epoxy resin, the improvement comprising:

providing a phenoxy terminated epoxy resin having a number average molecular weight between 4,000 and 40,000 and produced by reacting excess equivalents of bisphenol with lesser equivalents of epoxide;

copolymerizing ethylenically unsaturated monomers in the presence of said epoxy resin and in the absence of water to provide a carbon-to-carbon graft of said monomers to said epoxy resin backbone, the ethylenically unsaturated monomers comprising between 1% and 25% by weight alkylol acrylamide monomer and other ethylenically unsaturated monomer including functional monomer, said monomers copolymerized in the presence of at least 3% by weight peroxide initiator based on the weight of said monomers, where the copolymerized monomers comprise by weight between 10 and 100 weight parts per 100 weight parts of epoxy-resin, to produce an epoxy-acrylic graft copolymer having an Acid No. below 30; and dispersing said epoxy-acrylic graft copolymer into water by adding amine and water to the epoxy-acrylic graft copolymer.

9. The process in claim 8 where the phenoxy terminated epoxy resin is produced by reacting a low molecular weight liquid epoxy resin with excess equivalents of bisphenol-A.

10. The process in claim 8 where the phenoxy terminated epoxy resin is produced by reacting excess equivalents of bisphenol-A with lesser epoxide equivalents of bisglycidyl ether of bisphenol-A.

11. The process in claim 8 where the epoxy resin is dispersed into solvent prior to copolymerizing said monomers in the presence of the epoxy resin.

12. The process in claim 8 where the ethylenically unsaturated monomers include between 1% and 35% by weight carboxyl monomers based on the total weight of ethylenically unsaturated monomers copolymerized.

* * * * *